(12) United States Patent
Rickerby et al.

(10) Patent No.: US 6,565,931 B1
(45) Date of Patent: May 20, 2003

(54) CORROSION PROTECTIVE COATING FOR A METALLIC ARTICLE AND A METHOD OF APPLYING A CORROSION PROTECTIVE COATING TO A METALLIC ARTICLE

(75) Inventors: David S Rickerby, Derby (GB); Richard AB McCall, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 09/690,895

(22) Filed: Oct. 18, 2000

(30) Foreign Application Priority Data

Oct. 23, 1999 (GB) .............................................. 9925066
Nov. 9, 1999 (GB) ............................................. 9926357

(51) Int. Cl.$^7$ .............................................. C23C 16/08
(52) U.S. Cl. ...................... 427/569; 427/252; 427/253; 427/383.1; 427/383.7; 205/191; 205/192; 205/195; 205/224; 205/228; 148/516; 148/518; 148/277
(58) Field of Search ................................ 427/569, 252, 427/253, 383.1, 383.7; 205/191, 192, 195, 224, 228; 148/516, 518, 277; 416/241 R, 241 B

(56) References Cited

U.S. PATENT DOCUMENTS

| 3,928,026 A | 12/1975 | Hecht |
| 4,405,659 A | 9/1983 | Strangman |
| 4,451,431 A | 5/1984 | Naik |
| 4,753,686 A | 6/1988 | Company |
| 4,973,388 A | 11/1990 | Francois |
| 5,077,141 A | 12/1991 | Naik |
| 5,363,556 A | 11/1994 | Banholzer |
| 5,427,866 A | 6/1995 | Nagaraj |
| 5,624,721 A | 4/1997 | Strangman |
| 5,667,663 A * | 9/1997 | Rickerby et al. ........... 148/277 |
| 5,763,107 A | 6/1998 | Rickerby |
| 5,843,585 A | 12/1998 | Alperine |

FOREIGN PATENT DOCUMENTS

| EP | 0 587 341 A | 3/1994 |
| EP | 0 718 419 A | 6/1996 |
| EP | 0 718 420 A | 6/1996 |
| EP | 0 733 723 A | 9/1996 |
| EP | 0 814 178 A | 12/1997 |
| GB | 2 319 783 A | 6/1998 |
| WO | PCT/EP96/01578 A | 10/1996 |
| WO | PCT/US96/11592 A | 1/1997 |

OTHER PUBLICATIONS

ECF–11–Mechanisms and Mechanics of Damage and Failure –"High Temperature Corrosion of Fatigue Platinum Coated Mar–Mooz Nickel–Base Superalloy".

* cited by examiner

Primary Examiner—Timothy Meeks
(74) Attorney, Agent, or Firm—W. Warren Taltavull; Manelli, Denison & Selter PLLC

(57) ABSTRACT

The present invention provides for an etch and mar resistant low VOC clear coating composition most suitable for use as a top clear coat in multi-layered OEM or refinish automotive coatings. The coating composition includes isocyanate, carbonate and melamine components. The isocyanate component includes an aliphatic polyisocyanate. The composition may be formulated as a two-pack or one-pack coating composition, wherein the isocyanate functionalities are blocked with a blocker such as a mono-alcohol.

22 Claims, 4 Drawing Sheets

CORROSION PROTECTIVE COATING FOR A METALLIC ARTICLE AND A METHOD OF APPLYING A CORROSION PROTECTIVE COATING TO A METALLIC ARTICLE

FIELD OF THE INVENTION

The present invention relates to a protective coating for metallic articles and a method of applying a protective coating to a metallic article. The present invention relates in particular to a protective coating for a nickel base superalloy article or a cobalt base superalloy article.

BACKGROUND OF THE INVENTION

Conventional environmental protective coatings for nickel base superalloys, cobalt base superalloys and iron base superalloys include aluminide coatings, platinum modified aluminide coatings or chromium modified aluminide coatings for high temperature oxidation and Type 1 corrosion resistance.

Conventional environmental protective coatings for nickel base superalloys, cobalt base superalloys and iron base superalloys include silicide modified aluminide coatings or chromised coatings for lower temperature Type 2 corrosion resistance.

Aluminide coatings are generally applied by the well-known pack aluminising, out of pack aluminising or slurry aluminising processes. Platinum coatings are generally applied by electroplating, sputtering, or physical vapour deposition processes. Chromium coatings are generally applied by pack chromising or out of pack vapour chromising. Silicide coatings are generally applied by slurry aluminising.

It has been found that the roots, shanks and internal cooling passages of the turbine blades are suffering corrosion, particularly low chromium nickel base superalloy turbine blades. The roots, shanks and internal cooling passages of the turbine blades suffer from Type 2 corrosion, this is a particular problem at low temperatures, below about 850° C. The corrosion may lead to stress cracking of the aerofoils and/or roots of the turbine blades.

In the case of turbine blades, or turbine vanes, for gas turbine engines it is known to provide more than one environmental protective coating if more than one type of oxidation or corrosion is experienced.

Platinum aluminide coatings may be provided on the aerofoils of the turbine blades and chromised coatings may be provided on the shanks, roots and internal cooling passages of the turbine blade to provide environmental protection.

However, it has been found that for some metallic articles, that once the chromised coating has been penetrated by the corrosion, the corrosion of the underlying metallic article occurs at a greater rate than a metallic article without a chromised coating.

Platinum aluminide coatings may be provided on the aerofoils of the turbine blades and silicon aluminide coatings may be provided on the shanks, roots and internal cooling air passages of the turbine blade to provide environmental protection.

However, the silicon aluminide coating provides very good corrosion resistance but the silicon aluminide is brittle, suffers from cracking and is therefore not suitable for use on the roots of the turbine blades.

Additionally any coating for the root of the turbine blade must not impair the fatigue life of the root, shank or other portion of the turbine blade to such an extent that the turbine blade is unusable for practical purposes.

SUMMARY OF THE INVENTION

Accordingly the present invention seeks to provide a novel corrosion protective coating for a metallic article and a novel method of applying a corrosion protective coating to a metallic article which reduces, preferably overcomes, the above mentioned problems.

Accordingly the present invention provides a corrosion protective coating for a metallic article, the metallic article having at least one highly stressed region, the metallic article comprising a gamma phase and a gamma prime phase, the corrosion protective coating being arranged on the at least one highly stressed region of the metallic article, the corrosion protective coating comprising a platinum-group metal enriched outer layer on the metallic article, the outer layer of the metallic article predominantly comprising a platinum-group metal enriched gamma phase and a platinum-group metal enriched gamma prime phase.

Preferably the platinum-group metal enriched outer layer has a compressive stress.

Preferably the corrosion protective coating comprises a thin layer of oxide on the platinum-group metal enriched outer layer of the metallic article.

Preferably the platinum-group metal is platinum.

Preferably the platinum-group metal enriched outer layer of the metallic article comprises a controlled amount of silicon, aluminium or chromium.

Preferably the metallic article comprises a nickel base superalloy or a cobalt base superalloy.

Preferably the metallic article comprises a turbine blade or a turbine vane. Preferably the coating is on the root and/or shank of the turbine blade.

The present invention also provides a method of applying a corrosion protective coating to a metallic article, the metallic article having at least one highly stressed region, comprising the steps of:

applying a layer of platinum-group metal to the at least one highly stressed region of the metallic article, the metallic article comprises a gamma phase and a gamma prime phase, heat treating the metallic article to diffuse the platinum-group metal into the metallic article and thereby create a platinum-group metal enriched outer layer on the metallic article, the heat treatment being carried out at a temperature and for a time sufficient such that the platinum-group metal enriched outer layer of the metallic article predominantly comprises a platinum-group metal enriched gamma phase and a platinum-group metal enriched gamma prime phase.

Preferably a compressive stress is produced in the platinum-group metal enriched outer layer on the metallic article.

Preferably the method comprises forming a thin layer of oxide on the platinum-group metal enriched outer layer of the metallic article.

Preferably the heat treatment is carried out at a temperature of 1000° C. to 1200° C. More preferably the heat treatment is carried out at a temperature of 1100° C. to 1200° C.

Preferably the heat treatment is carried out for up to 6 hours. More preferably the heat treatment is carried out for up to 2 hours.

Preferably the platinum-group metal is applied by electroplating, physical vapour deposition, chemical vapour deposition, plasma assisted chemical vapour deposition.

Preferably the platinum-group metal is platinum.

Preferably the thickness of the layer of platinum-group metal as applied before heat treatment being between 2 micrometers and 12 micrometers. More preferably the thickness of the layer of platinum-group metal as applied before heat treatment is in the range 6 to 8 micrometers.

Preferably the thin adherent layer of oxide is formed by heating the platinum-group metal enriched outer layer in an oxygen containing atmosphere.

Preferably a controlled amount of silicon, aluminium or chromium is applied with or to the layer of platinum-group metal.

Preferably the metallic article comprises a nickel base superalloy or a cobalt base superalloy.

Preferably the metallic article comprises a turbine blade or a turbine vane. Preferably the coating is applied to the root and/or shank of the turbine blade.

Preferably the producing of the compressive stress in the platinum-group metal enriched outer layer on the metallic article comprises shot peening, laser shock peening or other suitable methods of peening.

Preferably the shot peening comprises directing metal particles or ceramic particles onto the platinum-group metal enriched outer layer on the metallic article.

The present invention will be more fully described by way of example with reference to the accompanying drawings in which:

DETAILED DESCRIPTION OF THE INVENTION

Figure 1:
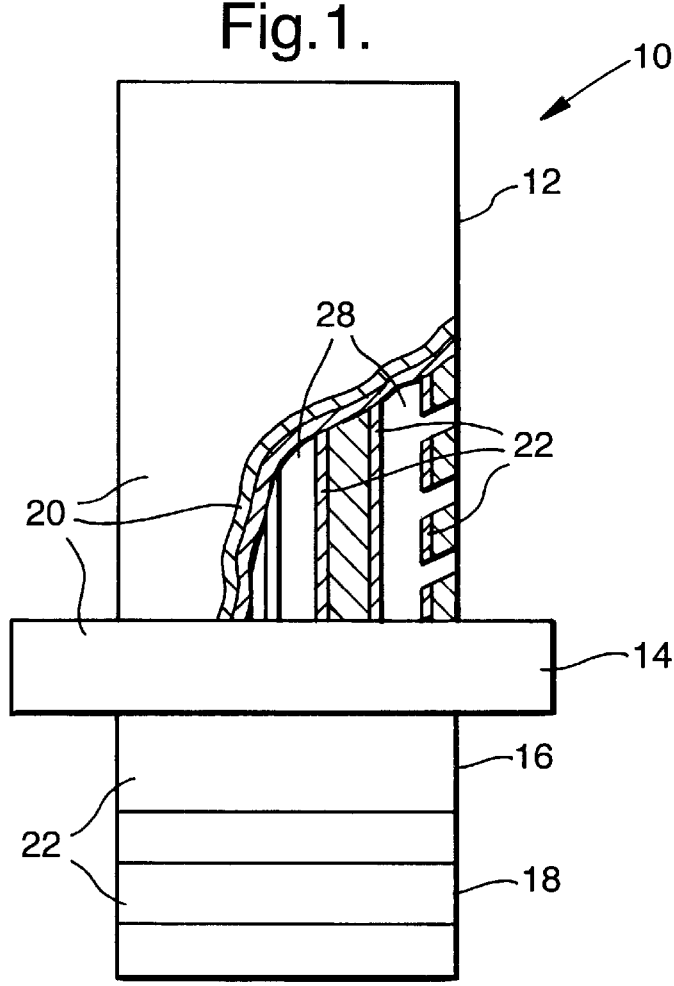
FIG. 1 shows a metallic turbine blade having a protective coating according to the present invention.

A gas turbine engine blade 10, as shown in FIG. 1, comprises an aerofoil 12, a platform 14, a shank 16 and a root 18. The turbine blade 10 has internal cooling air passages 28. The aerofoil 12 and the platform 14 of the turbine blade 10 have a protective coating 20 of platinum aluminide. The platinum aluminide coating 20 is preferably applied to all of the aerofoil 12 and that surface of the platform 14, which in use contacts the gas flowing through the turbine. The shank 16 and the root 18 of the turbine blade 10 have a protective coating 22 according to the present invention. Alternatively the protective coating 22 may be applied to any regions of the turbine blade 10 which suffer from low temperature corrosion and/or high temperature corrosion and oxidation, for example the internal cooling passages 28 of the turbine blade 10.

Figure 2:
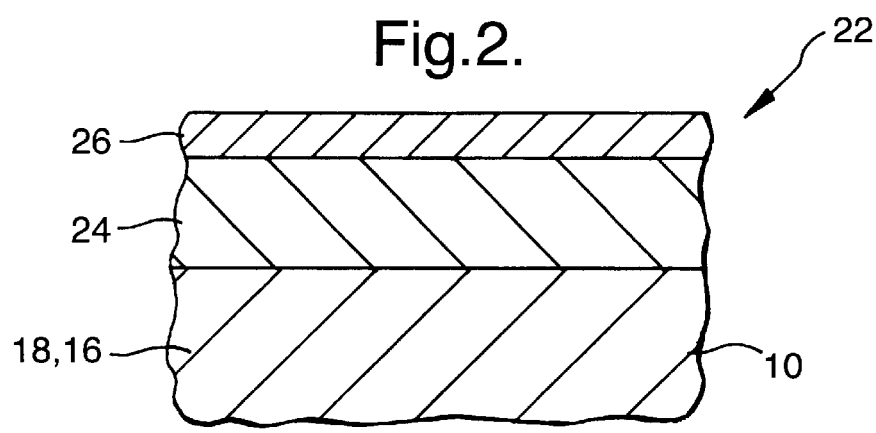
FIG. 2 is a cross-sectional view through the metallic turbine blade and protective coating shown in FIG. 1.
Figure 3:
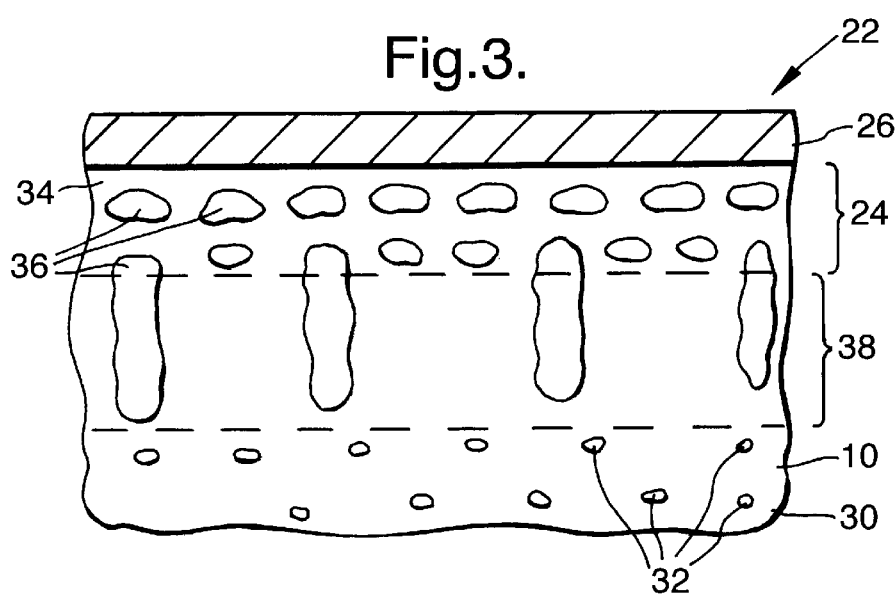
FIG. 3 is an enlarged cross-sectional view through the metallic turbine blade and protective coating shown in FIG. 1.

The metallic turbine blade 10 and protective coating 22 are shown more clearly in FIGS. 2 and 3. The protective coating 22 comprises a platinum-group metal enriched layer 24 on the surface of the metallic article 10 and a thin oxide layer 26 on the platinum-group metal enriched layer 24. The metallic turbine blade 10 is manufactured from a nickel base superalloy, a cobalt base superalloy or other alloy with gamma prime phases in a gamma phase matrix.

The coating 22 is produced by firstly cleaning the surface of the metallic turbine blade 10 by grit blasting with fine alumina grit and then degreasing. A layer of platinum-group metal of substantially constant thickness is deposited on the metallic turbine blade 10. The platinum-group metal is deposited to a thickness between 2 micrometers and 12 micrometers.

The thickness of the platinum-group metal is selected according to the requirements of the coating. A thick layer, at least 6 micrometers, of platinum-group metal will provide excellent corrosion resistance. A thin layer, less than 6 micrometers, of platinum-group metal will provide less corrosion resistance than 6 micrometers of platinum-group metal.

The platinum is deposited by electroplating, chemical vapour deposition, physical vapour deposition for example sputtering, plasma assisted chemical vapour deposition or any other suitable process. The chemical vapour deposition may be used to deposit the platinum-group metal on the surfaces of the internal cooling air passages 28.

The platinum-group metal-coated metallic turbine blade 10 is then diffusion heat treated so as to cause the platinum-group metal layer to combine with the alloy of the metallic turbine blade 10. This provides the platinum-group metal enriched layer 24 on the metallic turbine blade 10. The diffusion heat treatment is achieved by heating the metallic turbine blade 10 to a temperature in the range of 1000° C. to 1200° C., preferably 1100° C. to 1200° C. The heat treatment is either a heat treatment in vacuum conditions or heat treatment in a partial pressure of an inert gas, for example argon.

The microstructure of the metallic turbine blade 10 and the platinum-group metal enriched layer 24 is shown in FIG. 3. The metallic turbine blade 10 is manufactured from a nickel base superalloy, a cobalt base superalloy or other alloy which comprises a gamma prime phase matrix 30 and a gamma prime phase 32 in the gamma phase matrix 30. The platinum-group metal enriched layer 24 comprises a platinum-group metal enriched gamma phase matrix 34 and a platinum-group metal enriched gamma prime phase 36 in the platinum-group metal enriched gamma phase matrix 34. A layer 38 is formed in the metallic turbine blade 10 below the platinum-group metal enriched layer 24 which does not have any gamma prime phase 32. The heat treatment causes the aluminium in the gamma prime phase in the layer 38 to move to the platinum-group metal layer and hence breaks down the gamma prime phase due to aluminium's greater chemical affinity for platinum-group metal.

Any platinum-group metal may be used for example palladium, rhodium, iridium, however platinum is the preferred platinum-group metal. It may be possible to use a combination of two or more of the platinum-group metals for example platinum and rhodium, platinum and palladium or palladium and rhodium etc.

The heat treatment of a 7 $\mu$m thick layer of platinum into the nickel base superalloy results in a platinum enriched outer layer about 25 $\mu$m–30 $\mu$m thick. The heat treatment of a 4 $\mu$m thick layer of platinum into the nickel base superalloy results in a platinum enriched outer layer about 12 $\mu$m–15 $\mu$m thick.

It was initially believed that increasing the thickness of the platinum-group metal reduced the fatigue life. However, it is now believed that as long as the platinum-group metal enriched gamma phase and platinum-group metal enriched gamma prime phase layer is produced the fatigue life is not reduced because a ductile layer is produced. It is preferred that 6–8 micrometers, preferably 7 micrometers, of platinum-group metal are deposited onto the nickel base superalloy and diffused into the nickel base superalloy to produce the platinum enriched layer. This will provide excellent corrosion resistance and strain to crack and fatigue life better than aluminide coatings.

The platinum enriched layer comprises an outer zone, an intermediate zone and an inner zone. The outer zone comprises about 45 wt % Pt, about 35 wt % Ni, about 4.5 wt % Al, about 5 wt % Co, about 1 wt % Re and about 3 wt % each of Ta, W and Cr. The intermediate zone comprises 30–45 wt % Pt, 35–42 wt % Ni, 3–4.5 wt % Al, 4–8 wt % Co, 3–6 wt % W, 3–6 wt % Cr and about 4 wt % Ta. The inner zone comprises 10–25 wt % Pt, 42–55 wt % Ni, about 3 wt % Al, about 3.5 wt % Ta and the levels of Co, Cr, W Re are the same as in the nickel base superalloy.

The platinum-group metal enriched layer 24 is then treated so as to produce a compressive stress in the platinum-group metal enriched layer 24 to increase the fatigue life of the platinum-group metal enriched layer 24. The roots 18, in particular, need to resist both low and high cycle fatigue and in particular low cycle fatigue. The provision of the compressive stress in the platinum-group metal enriched layer 24 enables the coating 22 to be used in regions which experience fatigue, for example the roots 18 and the shanks 16.

The platinum-group metal enriched layer 24 is treated to provide the compressive stress by peening or other suitable process. The peening may comprise shot peening, laser shock peening or other suitable peening processes. The shot peening process may comprise directing metal, or ceramic, particles onto the surface of the platinum-group metal enriched layer 24 at ambient temperature. The shot peening may use gravity fed particles or pressure fed particles.

It may also be possible to add controlled amounts of silicon, aluminium and chromium into the platinum-group metal layer to enhance the corrosion resistance.

Figure 4:
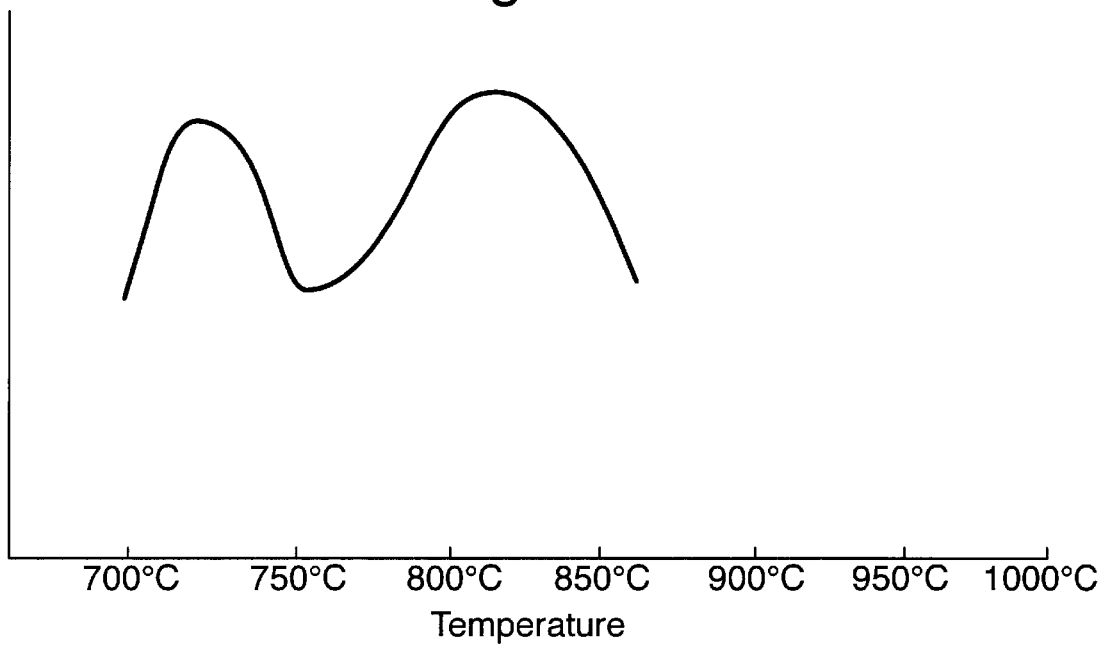
FIG. 4 is a graph showing corrosion rate against temperature for a metallic turbine blade without a protective coating.

FIG. 4 is a graph showing the corrosion rate of a typical nickel base superalloy. The graph indicates that there are two peaks of corrosion, one at approximately 720° C., Type 2 corrosion, and another at approximately 800° C., Type 1 corrosion.

The peak of corrosion occurring at 720° C. is due to attack of the nickel base superalloy by sulphates ($SO_3$). The sulphates from sodium sulphate ($Na_2SO_4$) and potassium sulphate ($K_2SO_4$) react with nickel oxide (NiO) and cobalt oxide (CoO) on the surface of the CMSX4 to form low melting point compounds nickel sulphate ($NiSO_4$) cobalt sulphate ($CoSO_4$). These compounds then attack the nickel base superalloy deeper within the article to form more nickel sulphate and cobalt sulphate.

The peak of corrosion occurring at 800° C. is due to attack of the nickel base superalloy by chlorides. The chloride from sodium chloride reacts with the protective oxide layer and underlying nickel base superalloy.

The corrosion reduces between 720° C. and 800° C. because at these temperatures the sulphates are no longer present. The corrosion reduces at 850° C. because the chloride is above its dew point. Above 850° C. the nickel base superalloy suffers from oxidation.

In a series of tests, samples of uncoated nickel base superalloys were tested for corrosion resistance at a temperature of 700° C. for 100, 200 and 500 hours and the results are shown in Table 1. Table 1 shows the average and maximum pit depth of corrosion in micrometers for various nickel base superalloys at a temperature of 700° C.

In another series of tests, samples of uncoated nickel base superalloys were tested for corrosion resistance at a temperature of 750° C. for 100, 200 and 500 hours and the results are shown in Table 2. Table 2 shows the average and maximum pit depth of corrosion in micrometers for various nickel base superalloys at a temperature of 750° C.

In another series of tests, samples of nickel base superalloys with various protective coatings were tested for corrosion resistance at a temperature of 700° C. for 100, 200 and 500 hours and the results are shown in Table 3. Table 3 shows the average and maximum pit depth of corrosion in micrometers for various nickel base superalloys with different protective coatings at a temperature of 700° C.

In a final series of tests, samples of nickel base superalloys with various protective coatings were tested for corrosion resistance at a temperature of 750° C. for 100, 200 and 500 hours and the results are shown in Table 4. Table 4 shows the average and maximum pit depth of corrosion in micrometers for various nickel base superalloys with different protective coatings at a temperature of 750° C.

In the tests conventional chromised and aluminised coatings were used and a platinum layer of 6-micrometer thickness heat treated for 2 hours at a temperature of 1100° C. was used. The tests involved subjecting the samples to air with sulphur dioxide at 300 volume parts per million with ash recoat, which is normal sea salt, every 20 hours with a salt concentration of 0.6 mg per square centimetre.

The nickel base superalloys tested were CMXS4, CMSX10 and MARM-002. CMSX4 and CMSX10 are trade names of the Cannon-Muskegon Corporation of 2875 Lincoln Street, Muskegon, Mich., MI 49443-0506, USA. CMSX4 has a nominal composition of 6.4 wt % tungsten, 9.5 wt % cobalt, 6.5 wt % chromium, 3.0 wt % rhenium, 5.6 wt % aluminium, 6.5 wt % tantalum, 1.0 wt % titanium, 0.1 wt % hafnium, 0.6 wt % molybdenum, 0.006 wt % carbon and the balance is nickel. CMSX10 has a nominal composition of 5.5 wt % tungsten, 3.3 wt % cobalt, 2.2 wt % chromium, 6.3 wt % rhenium, 5.75 wt % aluminium, 8.3 wt % tantalum, 0.23 wt % titanium, 0.05 wt % hafnium, 0.4 wt % molybdenum, 0.1 wt % niobium and the balance is nickel. MARM-002 is a trade name of the Martin Marietta Corporation, of Bethesda, Md., USA MARM-002 has a nominal composition of 10 wt % tungsten, 10 wt % cobalt, 9 wt % chromium, 5.5 wt % aluminium, 2.5 wt % tantalum, 1.5 wt % titanium, 1.5 wt % hafnium, 0.15 wt % carbon and the balance nickel.

TABLE 1

| Time | 100 Hrs | | 200 Hrs | | 500 Hrs | | 1000 Hrs | |
|---|---|---|---|---|---|---|---|---|
| Superalloy | Av | Max | Av | Max | Av | Max | Av | Max |
| CMSX4 | 15 | 52 | 61 | 79 | 183 | 359 | 350 | 510 |
| MARM-002 | 8 | 29 | 15 | 160 | 6 | 20 | 147 | 202 |
| CMSX10 | 12 | 38 | 96 | 156 | 104 | 170 | | |

TABLE 2

| Time | 100 Hrs | | 200 Hrs | | 500 Hrs | |
|---|---|---|---|---|---|---|
| Superalloy | Av | Max | Av | Max | Av | Max |
| CMSX4 | 3.8 | 6.4 | 2.9 | 12 | 4.3 | 59 |
| MARM-002 | 4.3 | 9.9 | 2.3 | 9.4 | 28 | 131 |
| CMSX10 | 6.7 | 27.5 | 10.5 | 48 | | |

TABLE 3

| Time | 100 Hrs | | 200 Hrs | | 500 Hrs | | 1000 Hrs | |
|---|---|---|---|---|---|---|---|---|
| Superalloy | Av | Max | Av | Max | Av | Max | Av | Max |
| CMSX4/Chromium | 14 | 42 | 1.5 | 6.3 | 72 | 243 | 50 | 160 |
| CMSX10/Chromium | 14.5 | 35 | 4.2 | 25 | 86 | 172 | 280 | 374 |
| CMSX4/Aluminium | 2.2 | 4.2 | 4.5 | 7.6 | 0 | 3.5 | 0 | 0 |
| CMSX4/Platinum | 2.6 | 3.9 | 1.6 | 6.5 | 0 | 1.8 | 1.1 | 2.3 |

TABLE 4

| Time | 100 Hrs | | 200 Hrs | | 500 Hrs | |
|---|---|---|---|---|---|---|
| Superalloy | Av | Max | Av | Max | Av | Max |
| CMSX4/Chromium | 14.5 | 35 | 7.8 | 82 | 10 | 38 |
| CMSX10/Chromium | 5.8 | 43.5 | 4 | 99 | 145 | 303 |
| CMSX4/Aluminium | 2.0 | 4.5 | 4.4 | 9.4 | 20 | 82 |
| CMSX4/Platinum | 2.6 | 3.9 | 0 | 8.4 | 0 | 2.5 |

It can be seen from Tables 3 and 4 that the platinum coating on the CMSX4 provides better protection than the aluminide coating on CMSX4 and the chromised coating on CMSX4.

It is believed that the platinum-group metal enriched layer on the metallic turbine blade provides protection against Type 2, sulphate corrosion, protection against Type 1, chloride corrosion, and protection against oxidation.

The platinum-group metal enriched layer firstly reduces the amount of nickel and/or cobalt at the surface of the metallic turbine blade available for reaction with the sulphate to form nickel sulphate and/or cobalt sulphate. This is because the platinum-group metal replaces the nickel and/or cobalt by substitution in the platinum-group metal enriched outer layer of the metallic turbine blade. Secondly the oxide layer on the platinum-group metal outer layer forms a protective layer, of alumina. The oxide layer forms a barrier to reduce, or prevent, nickel and/or cobalt reaching the surface to react with the sulphate to form nickel sulphate and/or cobalt sulphate. The oxide layer either forms during the heat treatment due to small levels of oxygen present during heat treatment or forms during use of the metallic article. The platinum-group metal enriched outer layer helps to maintain the oxide layer. The platinum-group metal enriched gamma phase and the platinum-group metal enriched gamma prime phase reduces the rate of diffusion of the nickel and other corrosion promoting elements to the surface.

The oxide layer forms a barrier to reduce, or prevent, the chloride attacking the metallic turbine blade. The oxide layer forms a barrier to reduce, or prevent, the oxidation of the metallic turbine blade.

In another series of tests the effect of producing a compressive stress in the platinum-group metal enriched layer was assessed. It is important that the introduction of the compressive stress does not result in cracking, or shearing, parallel to the surface of the platinum-group metal enriched layer, delamination of the platinum-group metal enriched layer or cracking perpendicular to the surface of the platinum-group metal enriched layer.

In a first test 110R steel shot, steel shot of $^{11}/_{1000}$ inch ($2.7 \times 10^{-4}$ m or 270 $\mu$m) diameter and regular hardness 45–55 Rockwell C hardness was directed at a platinum enriched layer on a CMSX4 nickel superalloy. The steel shot had an intensity of 9–12N, measured using Alman strips, and the platinum-enriched layer was peened for twice the length of time, 200% coverage, to peen the surface once. The platinum-enriched layer was examined and there was no cracking or delamination.

In a second test 110 R steel shot, steel shot of $^{11}/_{1000}$ inch ($2.7 \times 10^{-4}$ m or 270 $\mu$m) diameter and regular hardness 45–55 Rockwell C hardness was directed at a platinum enriched layer on a CMSX4 nickel superalloy. The steel shot had an intensity of 6–8A, measured using Alman strips, and the platinum-enriched layer was peened for twice the length of time, 200% coverage, to peen the surface once. The platinum-enriched layer was examined and there was no cracking or delamination. This peening introduces a compressive residual stress at the surface of the platinum enriched layer of about 400 MPa.

The Alman strips are attached to the component and are subjected to the same treatment as the component. The Alman strips deflect due to the peening and provide a measure of the amount of compressive stress applied to the platinum enriched layer.

It is preferred that the shot peening process uses steel shot of $^{11}/_{1000}$ inch ($2.7 \times 10^{-4}$ m or 270 $\mu$m) diameter and regular hardness 45–55 Rockwell C hardness, an intensity of 9–12N, measured using Alman strips, and the shot peening is for twice the length of time, 200% coverage, to peen the surface once.

Table 5 compares the onset of cracks in the aluminide coatings on CMSX4 and platinum coatings on CMSX4 under tensile loads at 650° C. and 750° C. It is clear from this table that the platinum enriched layer on the nickel base superalloy has better strain to crack performance than an aluminide coating.

TABLE 5

| Coating | Temperature ° C. | Strain to Crack % |
|---|---|---|
| Aluminium | 650 | 0.58 |
| Platinum | 650 | 1.1 |
| Platinum | 750 | 1.6 |

Figure 5:
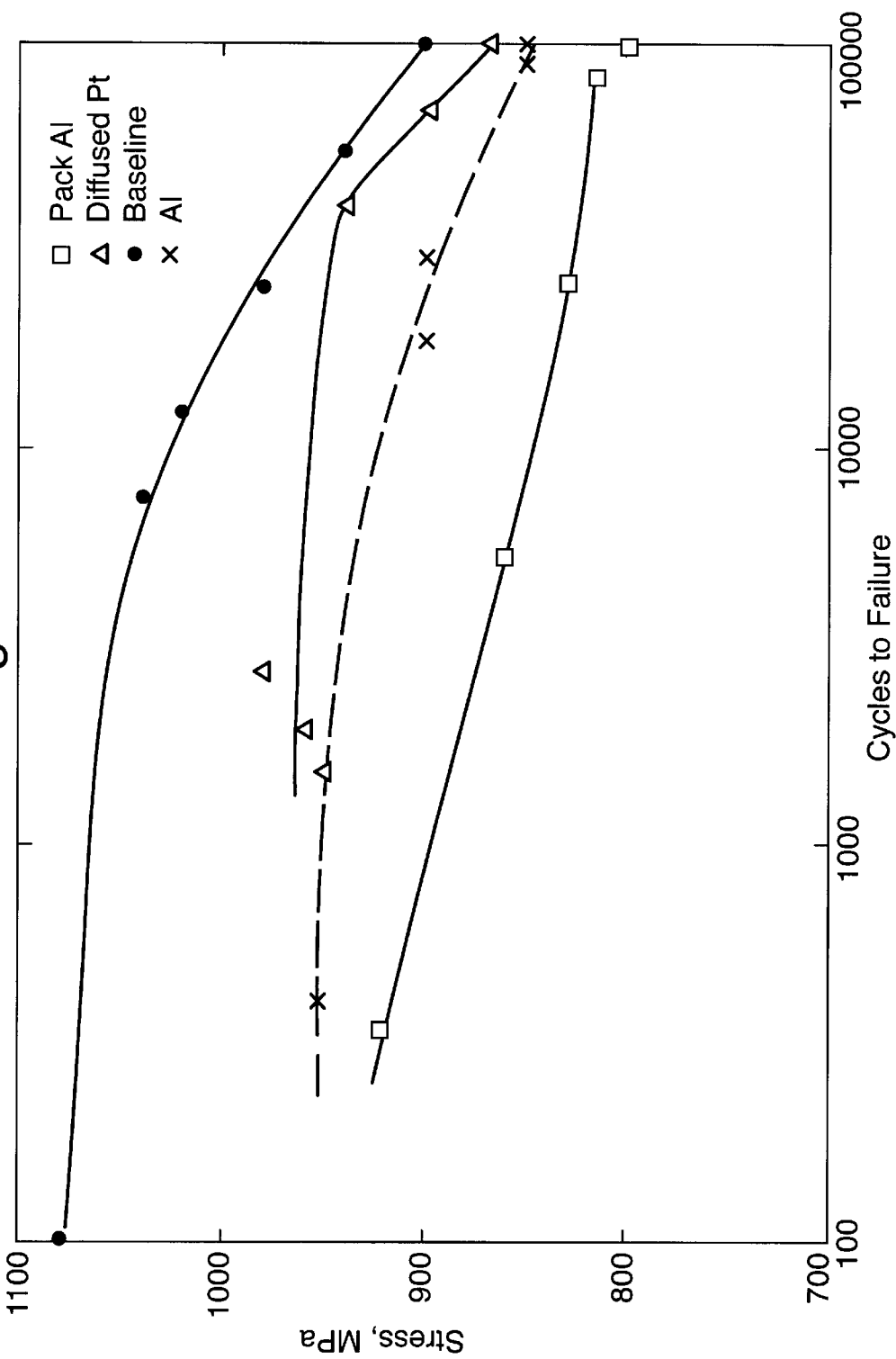
FIG. 5 is a graph showing the low cycle fatigue at 650° C. for metallic turbine blades with no coating and with various protective coatings.

FIG. 5 compares the low cycle fatigue characteristics of uncoated CMSX4, low temperature pack aluminised coating on CMSX4, platinum coating on CMSX4 and another commercial aluminised coating on CMSX4 at a temperature of 650° C. It is clear that the uncoated CMSX4 has the best low cycle fatigue life and that the platinum coated CMSX4 has a longer low cycle fatigue life than either of the two aluminide coatings on CMSX4.

Figure 6:
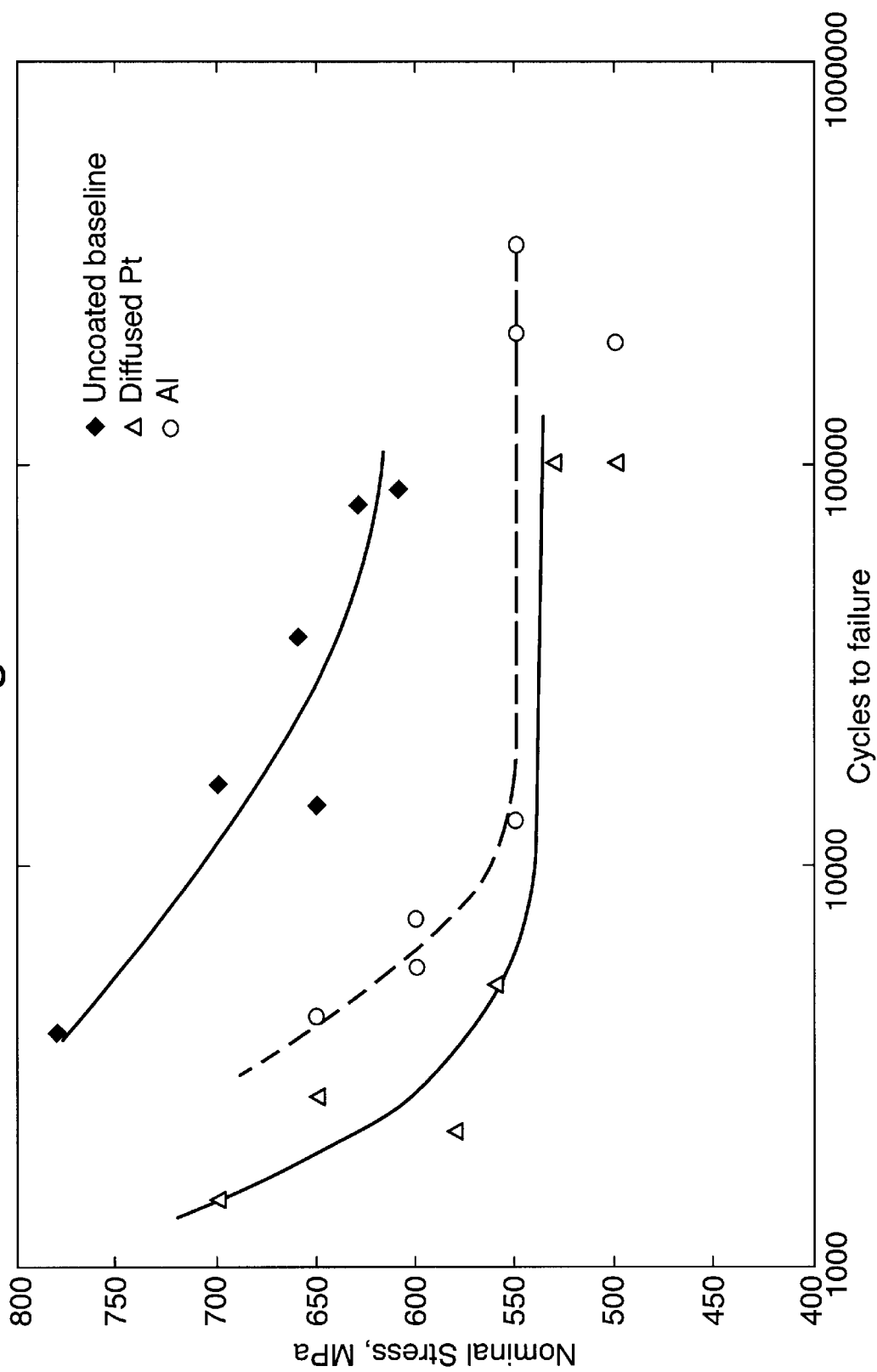
FIG. 6 is a graph showing the notched low cycle fatigue at 650° C., kt=2.29 for metallic turbine blades with no coating and with various protective coatings.

FIG. 6 compares the low cycle fatigue characteristics at 650° C. for notched samples at kt–2.29 for uncoated CMSX4, platinum coating on CMSX4 and the commercial aluminide coating on CMSX4. It is again clear that the uncoated CMSX4 has the best low cycle fatigue life and that the platinum coated CMSX4 and aluminide coated CMSX4 have similar low cycle fatigue lifes.

The platinum-group metal enriched layer is very stable due to the stability of the platinum-group metal enriched gamma phase and platinum-group metal enriched gamma prime phase. The platinum-group metal enriched layer is ductile, strain tolerant and is therefore resistant to cracking. The provision of the platinum-group metal enriched layer on the roots and/or shanks of the turbine blades therefore will not reduce the fatigue life of the roots and/or shanks of the turbine blades.

It is believed that the platinum-group metal enriched gamma prime phase and platinum-group metal enriched gamma phase structure is more ductile than the beta phase platinum aluminide structure because the aluminium content is insufficient to form the beta phase platinum aluminide. The platinum-group metal enriched gamma phase is soft/ductile compared to beta phase platinum aluminide or simple beta phase aluminide. The platinum-group metal enriched gamma prime phase is harder than the platinum-group metal enriched gamma phase but the platinum-group metal enriched gamma phase gives the platinum-group metal enriched gamma phase and platinum-group metal enriched gamma prime phase mixture greater ductility than a beta phase aluminide or beta phase platinum aluminide.

The platinum-group metal enriched layer is suitable for use on the root, shank and internal cooling air passages of turbine blades in combination with a platinum aluminide coating on the aerofoil and platform of the turbine blades. This is because the platinum-group metal may be deposited onto the whole of the turbine blade in a single operation and subsequently the aerofoil and platform only may be aluminised. This minimises the cost of providing a protective coating on the root, shank and internal cooling air passages of the turbine blades compared to the provision of a chromised coating or a silicon aluminide coating on the root, shank and internal cooling air passages of the turbine blades.

The coating of the present invention has the advantage of better corrosion resistance over the chromium coating. The coating of the present invention has the advantage of better ability to withstand high strain under tensile load and has a better low cycle fatigue life over the aluminide coating.

Although the invention has been described as being used on the roots, shanks and internal cooling passages of a turbine blade, which are highly stressed regions of a turbine blade, it may be used at other highly stressed regions of a turbine blade, a turbine vane or other metallic article.

Although the invention has been described with reference to shot peening of the platinum-group metal enriched layer, other peening processes and other processes may be used to impart a compressive stress into the platinum-group metal enriched layer.

Although the invention has been described with reference to turbine blades, the invention is equally applicable to turbine vanes and other metallic articles manufactured from nickel base superalloys, cobalt base superalloys or other alloys comprising gamma phase and gamma prime phases.

We claim:

1. A method of applying a corrosion protective coating to a region of metallic article, comprising the steps of:
   applying a layer of platinum-group metal to said region of the metallic article, the region of the metallic article comprising a gamma phase and a gamma prime phase,
   heat treating the metallic article to diffuse the platinum-group metal into the metallic article and thereby create a platinum-group metal enriched outer layer on the metallic article, the heat treatment being carried out at a temperature and for a time sufficient such that the platinum-group metal enriched outer layer of the metallic article predominantly comprises a platinum-group metal enriched gamma phase and platinum-group metal enriched gamma prime phase, wherein the metallic article is a turbine blade and the turbine blade comprises an aerofoil, a platform, a shank and a root, and the coating is applied to the root and/or shank of the turbine blade and the coating on the root and/or shank consists essentially of said platinum-group metal enriched outer layer.

2. A method as claimed in claim 1 comprising producing a compressive stress in the platinum-group metal enriched outer layer on the metallic article.

3. A method as claimed in claim 2 wherein the producing of the compressive stress in the platinum-group metal enriched outer layer on the metallic article comprises shot peening or laser shot peening.

4. A method as claimed in claim 3 wherein the shot peening comprises directing metal particles or ceramic particles onto the platinum-group metal enriched outer layer on the metallic article.

5. A method as claimed in claim 1 wherein the heat treatment is carried out at a temperature of 1000° C. to 1200° C.

6. A method as claimed in claim 1 wherein the heat treatment is carried out at a temperature of 1100° C. to 1200° C.

7. A method as claimed in claim 1 wherein the heat treatment is carried out for up to 6 hours.

8. A method as claimed in claim 1 wherein the platinum-group metal is supplied by electroplating, physical vapour deposition, chemical vapour deposition, or plasma assisted chemical vapour deposition.

9. A method as claimed in claim 1 wherein the platinum-group metal is platinum.

10. A method as claimed in claim 1 wherein the thickness of the layer of platinum-group metal as applied before treatment is between 2 micrometers and 12 micrometers.

11. A method as claimed in claim 10 wherein the thickness of the layer of platinum-group metal as applied before heat treatment is in the range 6 to 8 micrometers.

12. A method as claimed in claim 1 wherein the heat treatment is carried out for up to 2 hours.

13. A method as claimed in claim 1 wherein said platinum-group metal enriched layer includes a controlled amount of silicon, aluminum or chromium.

14. A method as claimed in claim 1 wherein the metallic article comprises a nickel base superalloy or a cobalt base superalloy.

15. A method of applying a corrosion protective coating to a region of a metallic article, comprising the steps of:
   applying a layer of platinum-group metal to regions of the metallic article, the metallic article comprising a gamma phase and a gamma prime phase,
   heat treating the metallic article to diffuse the platinum-group metal into the metallic article and thereby create a platinum-group metal enriched outer layer on the metallic article, the heat treatment being carried out at a temperature and for a time sufficient such that the platinum-group metal enriched outer layer of the metallic article predominantly comprises a platinum-group metal enriched gamma phase and platinum-group metal enriched gamma prime phase wherein the metallic article is a turbine blade or a turbine vane and said metallic article includes internal cooling passages, and the coating is applied to the internal cooling passages, and the coating on the internal cooling passages consists essentially of platinum-group metal enriched outer layer.

16. A method of applying a corrosion protective coating to a region of a metallic article comprising the steps of:

applying a layer of platinum-group metal to regions of the metallic article, the metallic article comprising a gamma phase and a gamma prime phase, heat treating the metallic article to diffuse the platinum-group metal into the metallic article and thereby create a platinum-group metal enriched outer layer on the metallic article, the heat treatment being carried out at a temperature and for a time sufficient such that the platinum-group metal enriched outer layer of the metallic article predominantly comprises a platinum-group metal enriched gamma phase and platinum-group metal enriched gamma prime phase, wherein the metallic article is a turbine blade and the turbine blade comprises an aerofoil, a platform, a shank and a root, the coating is applied to the root and/or shank of the turbine blade and the coating on the root and/or shank consists essentially of said platinum-group metal enriched outer layer and an outer oxide layer formed during said heat treatment.

17. A method as claimed in claim 16 wherein the outer oxide layer is formed by heating the platinum-group metal enriched outer layer in an oxygen containing atmosphere.

18. A method as claimed in claim 16 wherein the metallic article is a turbine blade.

19. A method as claimed in claim 18 wherein the turbine blade comprises an aerofoil, a platform, a shank and a root, and the coating is applied to the root and/or shank of the turbine blade.

20. A method as claimed in claim 18 wherein the turbine blade comprises internal cooling passages, and the coating is applied to the internal cooling passages.

21. A method as claimed in claim 18 wherein the turbine blade comprises an aerofoil, a platform, a shank and a root, and the coating is applied to the shank of the turbine blade.

22. A method as claimed in claim 18 wherein the turbine blade comprises an aerofoil, a platform, a shank and a root, and the coating is applied to the root and shank of the turbine blade.

* * * * *